US011925896B2

(12) United States Patent
Yamawaki

(10) Patent No.: US 11,925,896 B2
(45) Date of Patent: Mar. 12, 2024

(54) GAS SEPARATION METHOD AND GAS SEPARATION DEVICE

(71) Applicant: TAIYO NIPPON SANSO CORPORATION, Tokyo (JP)

(72) Inventor: Masaya Yamawaki, Tokyo (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 0 days.

(21) Appl. No.: 18/027,328

(22) PCT Filed: Sep. 27, 2021

(86) PCT No.: PCT/JP2021/035248
§ 371 (c)(1),
(2) Date: Mar. 20, 2023

(87) PCT Pub. No.: WO2022/065466
PCT Pub. Date: Mar. 31, 2022

(65) Prior Publication Data
US 2023/0356141 A1 Nov. 9, 2023

(30) Foreign Application Priority Data
Sep. 28, 2020 (JP) .................... 2020-162196

(51) Int. Cl.
*B01D 53/04* (2006.01)
*B01D 53/047* (2006.01)
*C01B 23/00* (2006.01)

(52) U.S. Cl.
CPC ........ *B01D 53/047* (2013.01); *C01B 23/0052* (2013.01); *B01D 2256/24* (2013.01);
(Continued)

(58) Field of Classification Search
CPC .... B01D 53/047; C01B 23/00; C01B 23/0052
See application file for complete search history.

(56) References Cited

U.S. PATENT DOCUMENTS

| 4,194,890 A | * | 3/1980 | McCombs | ........... | B01D 53/047 |
| | | | | | 95/98 |
| 6,923,844 B2 | * | 8/2005 | Urakami | .............. | B01D 53/047 |
| | | | | | 96/111 |

(Continued)

FOREIGN PATENT DOCUMENTS

| JP | 2002-126435 | 5/2002 |
| JP | 2003-71231 A | 3/2003 |

(Continued)

OTHER PUBLICATIONS

Notice of Allowance dated Jun. 20, 2023 in Japanese Application No. 2022-552092, with English translation, 4 pages.

(Continued)

*Primary Examiner* — Sharon Pregler
(74) *Attorney, Agent, or Firm* — Nixon & Vanderhye P.C.

(57) ABSTRACT

A gas separation method in which a rare as a first introduced gas and an impurity gas as a second introduced gas, are introduced into a raw material gas. Each of the flow rates of the first and second introduced gases is controlled based on the flow rates of the rare gas and impurity gas in the discharged gas from a rare gas using facility. A gas separation device includes an introduction pipe for introducing rare gas in a separation gas container into a raw material gas, an introduction pipe for introducing impurity gases in the separation gas container into the raw material gas, a flow meter provided in a supply pipe for supplying a discharged gas of a rare gas using facility, and an arithmetic device electrically connected to each of the flow meter the flow rate controller, and the flow rate controller.

20 Claims, 3 Drawing Sheets

(52) U.S. Cl.
CPC .... *B01D 2257/102* (2013.01); *B01D 2257/11* (2013.01); *B01D 2259/40007* (2013.01)

(56) References Cited

U.S. PATENT DOCUMENTS

| | | | |
|---|---|---|---|
| 9,339,759 B2* | 5/2016 | Won | ............ B01D 53/047 |
| 10,710,019 B2* | 7/2020 | Tanaka | ............ C07C 7/144 |
| 2005/0000355 A1* | 1/2005 | Urakami | ............ B01D 53/047 95/96 |
| 2005/0109419 A1 | 5/2005 | Ohmi et al. | |
| 2015/0273391 A1* | 10/2015 | Won | ............ B01D 53/229 96/4 |
| 2019/0126187 A1* | 5/2019 | Tanaka | ............ B01D 53/229 |
| 2023/0356141 A1* | 11/2023 | Yamawaki | ............ C01B 23/0052 |

FOREIGN PATENT DOCUMENTS

| | | |
|---|---|---|
| JP | 2003-164720 | 6/2003 |
| JP | 2005-103400 A | 4/2005 |
| JP | 2010-241686 | 10/2010 |
| WO | 03/045536 | 6/2003 |

OTHER PUBLICATIONS

International Search Report dated Dec. 7, 2021, for PCT/JP2021/035248, 5 pp.
Written Opinion of the ISA dated Dec. 7, 2021, for PCT/JP2021/035248, 4 pp.

\* cited by examiner

GAS SEPARATION METHOD AND GAS SEPARATION DEVICE

CROSS-REFERENCE TO RELATED APPLICATIONS

This application is the U.S. national phase of International Application No. PCT/JP2021/035248 filed Sep. 27, 2021, which designated the U.S. and claims priority to JP 2020-162196 filed Sep. 28, 2020, the entire contents of each of which are hereby incorporated by reference.

TECHNICAL FIELD

The present invention relates to a gas separation method and a gas separation device.

BACKGROUND ART

High value-added gases such as krypton and xenon are used in industrial fields, industrial equipment, and the like that generate plasma by high-frequency discharge. As a method for purifying these high-value-added gases, a gas separation method is known in which a first gas component and a second gas component are separated from a raw material gas containing multiple gas components by pressure adsorption (Patent Document 1).

Patent Document 1 proposes to separate and purify krypton, xenon, and the like by combining a balanced pressure swing adsorption separation method and a rate pressure swing adsorption separation method.

PRIOR ART DOCUMENTS

Patent Documents

Patent Document 1: Japanese Unexamined Patent Application, First Publication No. 2002-126435

SUMMARY OF INVENTION

Problem to be Solved by the Invention

Since rare gas is a high value-added gas, the reuse of discharged gas containing rare gas from a rare gas using facility is important from an economic point of view. However, the concentration of each gas component in the discharged gas from the rare gas using facility varies greatly depending on the operating state of the rare gas using facility.

In Patent Document 1, different adsorption separation methods are combined to remove components other than the rare gas from the raw material gas (purification of the rare gas) and to remove the rare gas (purification of the component other than the rare gas). However, if the concentration of each component in the discharged gas from the rare gas using facility changes, the following problems arise.

When the ratio of rare gas components in the discharged gas decreases and the ratio of gas components other than the rare gas components increases, the concentration of the gas components to be adsorbed and removed by an adsorbent for removing gas components other than the rare gas components relatively increases. As a result, the pressure in the adsorption tower decreases and the gas components other than the rare gas components cannot be sufficiently removed. As a result, the purity of the rare gas after separation is lowered.

When the ratio of the rare gas components in the discharged gas increases and the ratio of the gas components other than the rare gas components decreases, the concentration of the rare gas components to be removed by an adsorption for removing the rare gas components increases relatively. As a result, the pressure in the adsorption tower decreases and the rare gas component cannot be sufficiently removed. As a result, the purity of the components other than the rare gas after separation is lowered, that is, the recovery rate of the rare gas is lowered.

As a countermeasure for the problems above, a method of changing the separation conditions of the adsorption tower in accordance with fluctuations in the composition of the discharged gas is also conceivable. However, control of the separation conditions of the adsorption tower involves inverter control of a flow rate of gas discharged from the compressor and change of a switching time during an adsorption process and an regeneration process. Furthermore, by changing the switching time, the timing and gas amount for returning a mixed gas containing gas components discharged in a regeneration process of the adsorption tower into the raw material gas are changed, which is the feature of Patent Document 1. As a result, the composition of the raw material gas will further fluctuate, and as a result, a very complicated control burden is required.

As explained above, in the conventional gas separation method, when the discharged gas from the rare gas using facility is to be reused, it is difficult to increase stably both the purity of the separated rare gas and the recovery rate of the rare gas The present invention provides a gas separation method and a gas separation device capable of stably increasing both the purity of the separated rare gas and the recovery rate of the rare gas while reusing the discharged gas from the rare gas using facility.

Means for Solving the Problem

In order to achieve the object above, the present invention provides the following gas separation methods and gas separation devices.

[1] A gas separation method in which a first gas component and a second gas component are separated from a raw material gas containing a plurality of gas components by pressure adsorption,
  wherein the gas separation method includes an introduction step in which the first gas component separated from the raw material gas is introduced as a first introduced gas into the raw material gas, and the second gas component separated from the raw material gas is introduced as a second introduced gas into the raw material gas, and
  wherein each of a flow rate $V_{R1}$ of the first introduced gas and a flow rate $V_{R2}$ of the second introduced gas is adjusted based on each of the flow rates of the first gas component and the second gas component in a discharged gas discharged from a rare gas using facility.

[2] The gas separation method according to [1],
  wherein each of the following total gas flow rate S1 and total gas flow rate S2 is controlled to a constant value.
  Total gas flow rate S1: total of a flow rate $V_{F1}$ of the first gas component in the discharged gas and the flow rate $V_{R1}$ of the first introduced gas
  Total gas flow rate S2: total of a flow rate $V_{F2}$ of the second gas component in the discharged gas and the flow rate $V_{R2}$ of the second introduced gas

[3] The gas separation method according to [1] or [2], wherein the first gas component is krypton or xenon.

[4] The gas separation method according to any one of [1] to [3], wherein the second gas component contains at least one selected from the group consisting of hydrogen, nitrogen, oxygen, helium, neon and argon.

[5] The gas separation method according to [1], wherein the discharged gas discharged from the rare gas using facility further contains a third gas component, wherein after the first gas component separated from the raw material gas is introduced into the raw material gas as the first introduced gas, and the second gas component separated from the raw material gas is introduced as the second introduced gas into the raw material gas, the third gas component is removed from the raw material gas.

[6] The gas separation method according to [5], wherein the third gas component is an organic compound.

[7] A separation device including:

a separation unit that separates a first gas component and a second gas component from a raw material gas containing a plurality of gas components by pressure adsorption, a raw material gas container that stores the raw material gas;

a first supply pipe that supplies a discharged gas discharged from a rare gas using facility into the raw material gas container;

a second supply pipe that connects the raw material gas container and the separation unit;

a first separated gas container that stores the first gas component separated by the separation unit;

a second separated gas container that stores the second gas component separated by the separation unit;

a first introduction pipe that introduces the first gas component in the first separation gas container as a first introduction gas into the raw material gas;

a second introduction pipe that introduces the second gas component in the second separation gas container as a second introduction gas into the raw material gas;

a first flow rate controller that is provided in the first introduction pipe;

a second flow rate controller that is provided in the second introduction pipe;

a flow rate information acquisition device that acquire flow rate information of the first gas component and the second gas component which flow through the first supply pipe; and an arithmetic device that is electrically connected to each of the first flow rate controller, the second flow rate controller, and the flow rate information acquisition device.

[8] The gas separation device according to [7], wherein the flow rate information acquisition device include at least one selected from the group consisting of a flow rate meter provided in the first supply pipe, a densitometer that is provided in the first supply pipe and measures the concentration of the first gas component, a densitometer that is provided in the first supply pipe and measures the concentration of the second gas component, a receiver that electrically receives from the rare gas using facility the flow rate information of the first gas component discharged from the rare gas using facility, and a receiver that electronically receives from the rare gas using facility the flow rate information of the second gas component used in the rare gas using facility.

[9] The gas separation device according to [7] or [8], wherein the gas separation device further includes a first densitometer that measures the concentration of the first gas component in the first introduction pipe, and is provided in the first introduction pipe, and the first densitometer is also electrically connected to the arithmetic device.

[10] The gas separation device according to any one of [7] to [9], wherein the gas separation device further includes a second densitometer that measures the concentration of the second gas component in the second introduction pipe, and is provided in the second introduction pipe, and the second densitometer is also electrically connected to the arithmetic device.

[11] The gas separation device according to any one of [7] to [10], wherein the first gas component is krypton or xenon.

[12] The gas separation device according to any one of [7] to [11], wherein the second gas component contains at least one selected from the group consisting of hydrogen, nitrogen, oxygen, helium, neon and argon.

[13] The gas separation device according to [9], wherein the discharged gas from the rare gas using facility further contains a third gas component, wherein the gas separation device further includes a third gas removal device that removes the third gas component that is located in the first supply pipe on the rear stage of the first densitometer, and wherein the first introduction pipe and the second introduction pipe are connected to the first supply pipe between the first densitometer and the third gas component removal device.

[14] The gas separation device according to [13], wherein the third gas component is an organic compound.

Effects of the Invention

According to the present invention, it is possible to stably increase both the purity of the separated rare gas and the recovery rate of the rare gas while reusing the discharged gas from the rare gas using facility.

DETAILED DESCRIPTION OF THE PREFERRED EMBODIMENTS

An embodiment will be described in detail below with reference to the figures. In the figures used in the following description, in order to make the features easier to understand, the characteristic parts may be shown enlarged for convenience, and the dimensional ratios of each component may not necessarily be the same as the actual ones.

In the present description, "~" indicating a numerical range means that the numerical values before and after it are included as lower and upper limits.

First Embodiment

<Gas Separation Device>

A gas separation device according to the present embodiment will be described below with reference to FIGS. 1 and 2.

Figure 1:
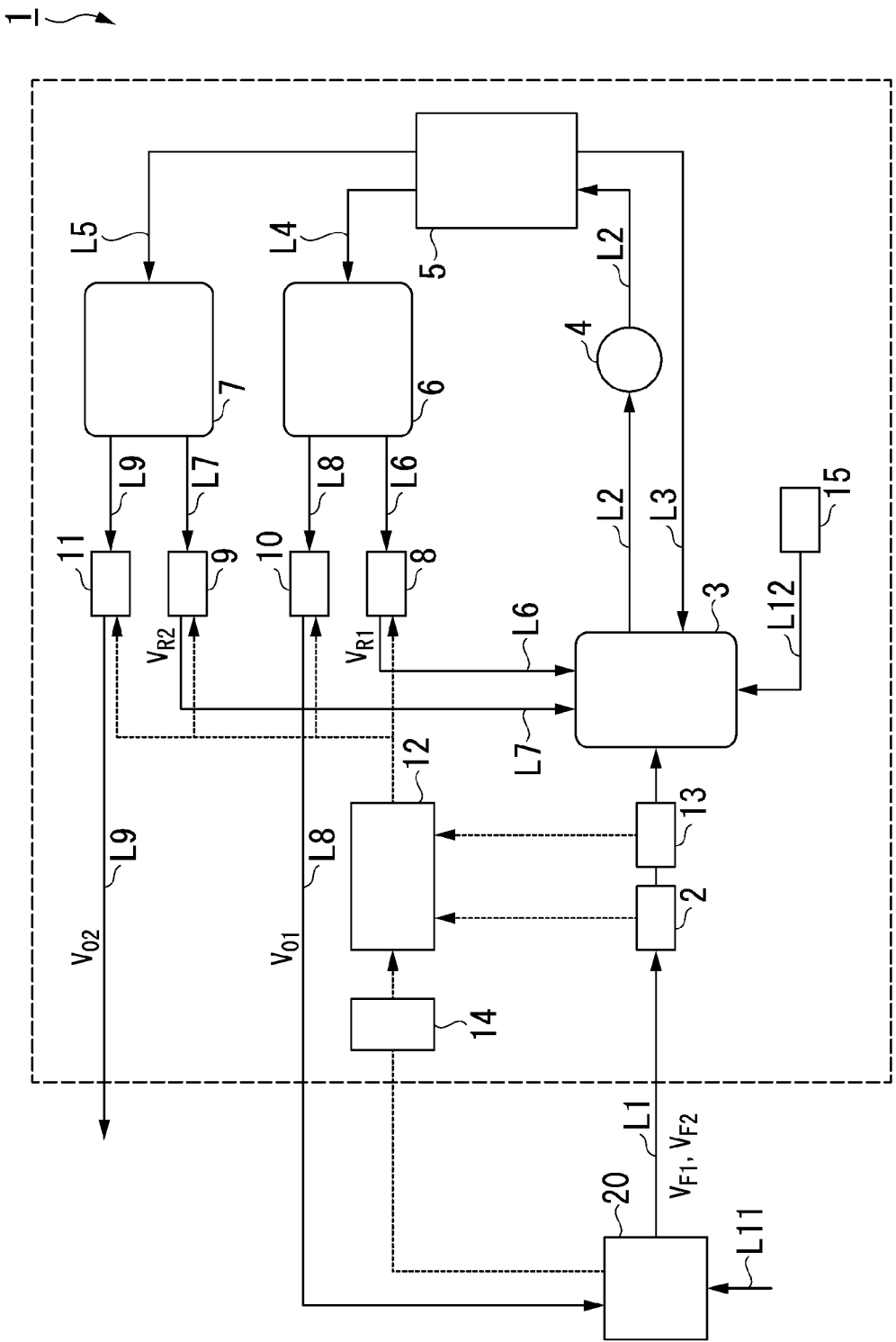
FIG. 1 is a schematic diagram showing a gas separation device according to a first embodiment and a rare gas using facility.
Figure 2:
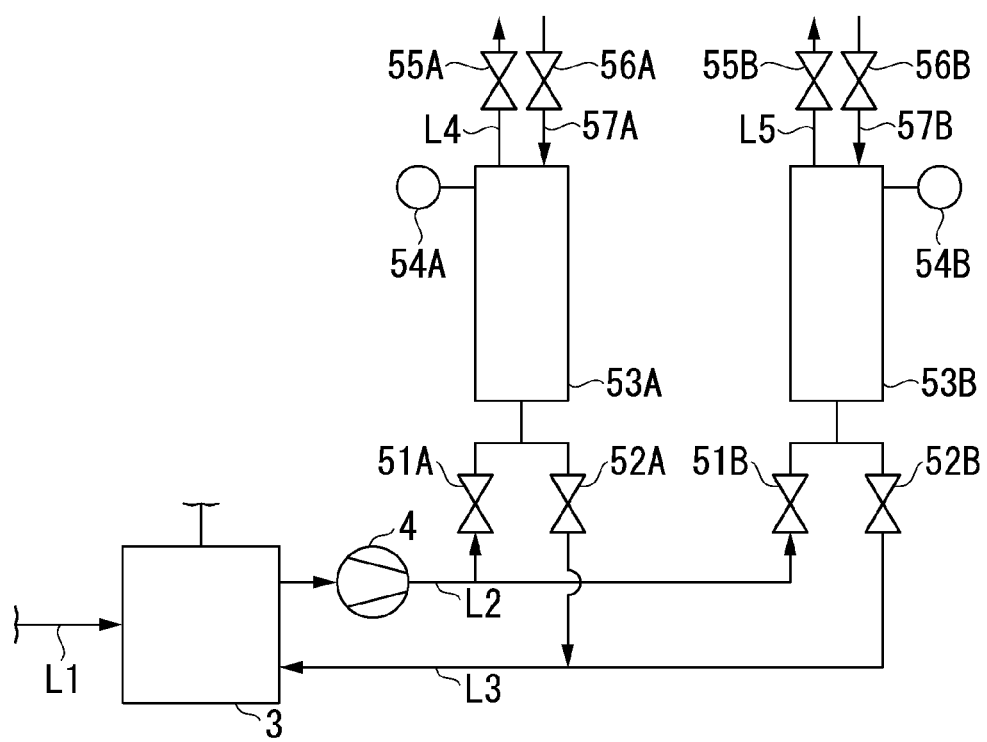
FIG. 2 is a schematic diagram showing the configuration of a separation unit included in the gas separation device shown in FIG. 1.

FIG. 1 is a schematic diagram showing a gas separation device 1 according to the present embodiment and a rare gas using facility 20. FIG. 2 is a schematic diagram showing the configuration of a separating section 5.

The gas separation device 1 is a device that separates a first gas component and a second gas component from a raw material gas including a discharged gas discharged from the rare gas using facility 20 by pressure adsorption.

The gas separation device 1 includes a first supply pipe L1, a flow meter 2, a densitometer 13, a raw material gas container 3, a first gas component supply source 15, a second supply pipe L2, a compressor. 4, a separation unit 5, a returning pipe L3, a first separation pipe L4, a second separation pipe 15, a first separation gas container 6, a first introduction pipe L6, a second separation gas container 7, a second introduction pipe L7, a first flow rate controller 8, a second flow rate controller 9, a first lead-out pipe L8, a second lead-out pipe L9, and a third flow rate controller 10, a fourth flow rate controller 11, an arithmetic device 12, and a receiver 14.

The rare gas using facility 20 is connected to a second end of the first lead-out pipe L8 of the gas separation device 1. The first gas component separated by the gas separation device 1 flows through the first lead-out pipe L8. The rare gas using facility 20 is connected to the third supply pipe L11 of which a first end is connected to a second gas component supply facility (not shown). The second gas component flows through the third supply pipe L11. Therefore, the rare gas using facility 20 can use the first gas component separated by the gas separation device 1 and the second gas component supplied from the second gas component supply facility (not shown).

The rare gas using facility 20 may be electrically connected to an arithmetic device 12, which will be described later. In addition, the rare gas using facility 20 may transmit the flow rate of the first gas component used and discharged in the rare gas using facility and the flow rate of the second gas component to the arithmetic device 12 as electrical signals.

The rare gas using facility 20 is not particularly limited as long as it uses a rare gas. Examples thereof include equipment for manufacturing semiconductor integrated devices and the like, inspection equipment, and equipment for manufacturing display devices such as liquid crystal panels.

The discharged gas from the rare gas using facility 20 contains the first gas component as a gas component to be purified and the second gas component as a gas component to be removed. Examples of the first gas component include high value-added gases such as krypton and xenon. Examples of the second gas component include hydrogen, nitrogen, oxygen, helium, neon, and argon.

The first supply pipe L1 is connected at a first end to the rare gas using facility 20 and at a second end to the raw material gas container 3. The first supply pipe L1 supplies the discharged gas discharged from the rare gas using facility 20 into the raw material gas container 3.

The flow rate meter 2 is provided in the first supply pipe L1. The flow rate meter 2 measures the flow rate of the discharged gas from the rare gas using facility 20 flowing through the first supply pipe L1. The flow rate meter 2 may be one which can measure the total $V_{F0}$ of the flow rate $V_{F1}$ of the first gas component and the flow rate $V_{F2}$ of the second gas component in the discharged gas, and can transmit the flow rate value as an electrical signal. For example, the flow rate meter 2 may be a mass flow meter, a Coriolis flow rate meter, a positive displacement flow rate meter, and the like. The flow rate meter 2 is electrically connected to the arithmetic device 12 so that it can transmit the measured value of the flow rate $V_{F0}$ to the arithmetic device 12. The flow rate meter 2 may be able to measure each of $V_{F1}$ and $V_{F2}$.

The gas separation device 1 of the present embodiment includes a flow rate information acquisition device for acquiring flow rate information of the first gas component and the second gas component flowing through the first supply pipe L1. In the gas separation device 1, for example, a densitometer 13 is provided in the first supply pipe L1. The densitometer 13 can measure the concentration of the first gas component, the second gas component, or both in the discharged gas. The densitometer 13 may be one which can measure the concentration of the first gas component, the second gas component, or both, and can transmit the concentration value as an electric signal. As the densitometer 13, for example, an ultrasonic densitometer, a mass spectrometer, or the like can be used. The densitometer 13 can transmit a concentration value of the first gas component, a concentration value the second gas component, or concentration values both of them to the arithmetic device 12 as electrical signals.

The flow rate information acquisition device is not particularly limited as long as it can acquire VF and $V_{F2}$ as information. In another embodiment, for example, the flow rate information acquisition device may be one including at least one selected from the group consisting of a flow rate meter provided in the first supply pipe L1, a densitometer provided in the first supply pipe L1 for measuring the concentration of the first gas component, a densitometer for measuring the concentration of the second gas component provided in the first supply pipe L1, a receiver that electrically receives from the rare gas using facility 20 the flow rate information of the first gas component discharged from the rare gas using facility 20, and a receiver that electronically receives from the rare gas using facility 20 the flow rate information of the second gas component used in the rare gas using facility 20.

For example, in the gas separation device 1, the receiver 14 can electrically receive from the rare gas using facility 20 the flow rate information of the first gas component discharged from the rare gas using facility 20. Additionally, the receiver 14 can electronically receive from the rare gas using facility 20 the flow rate information of the second gas component used in the rare gas using facility 20.

However, the flow rate information acquisition device is not limited to the examples above.

The raw material gas container 3 stores the raw material gas to be supplied into the separation unit 5. The raw material gas container 3 is connected to a second end of the first supply pipe L1, a second end of the returning pipe 13, a second end of the first introduction pipe L6, and a second end of the second introduction pipe L7. Therefore, the gases supplied from the first supply pipe L1, the returning pipe L3, the first introduction pipe L6, and the second introduction pipe 17 are mixed in the raw material gas container 3, and the mixed gas is stored as the raw material gas. A replenishment pipe L12 may be connected to the raw material gas container 3 for replenishing the first gas component in the gas separation device 1. The replenishment pipe L12 is connected to the first gas component supply source 15. The first gas component supply source 15 is, for example, a container or the like in which the first gas component is stored.

The second supply pipe L2 is connected at a first end to the raw material gas container 3 and at a second end to the primary side of the separation unit 5. The compressor 4 is provided in the second supply pipe L2. The second supply pipe L2 compresses the raw material gas in the raw material gas container 3 with the compressor 4 and supplies it to the primary side of the separation unit 5. The compressor 4 may be a general one used for a pressure adsorption gas separation method, and is not particularly limited. However, the compressor 4 is preferably an oil-free compressor that does not contaminate the raw material gas supplied into the separation unit 5 and that is highly airtight without entrainment of air or leakage of the raw material gas. For example, a diaphragm compressor or the like can be used as the compressor 4.

The separation unit 5 separates the first gas component and the second gas component from the raw material gas by pressure adsorption. As shown in FIG. 2, the separation unit 5 includes a first adsorption tower 53A and a second adsorption tower 53B. Each of the branched second ends of the second supply pipe L2 is connected to each of the first adsorption tower 53A and the second adsorption tower 53B. Each of supply valves 51A and 51B is provided at the branched second ends of the second supply pipe 12.

The first adsorption tower 53A includes therein a first adsorbent (not shown) that adsorbs the second gas component in the raw material gas. The first adsorbent may be any material as long as it can adsorb the second gas component, and can be appropriately selected according to the second gas component. For example, when the second gas component is nitrogen, the first adsorbent is preferably Na-A-type zeolite, carbon molecular sieves, mesoporous silica, or metal organic framework (MOF).

The first adsorption tower 53A removes the second gas component from the raw material gas and leads out the first gas component to the secondary side of the separation unit 5. The secondary side of the first adsorption tower 53A is connected to the first end of the first separation pipe L4. The first adsorption tower 53A leads out the first gas component separated into the first separation pipe L4.

The first separation pipe L4 connects the first adsorption tower 53A of the separation unit 5 and the first separation gas container 6. The first separated gas container 6 stores the first gas component separated by the first adsorption tower 53A of the separation unit 5. A first end of the first introduction pipe L6 and a first end of the first lead-out pipe L8 are connected to the first separation gas container 6.

The second adsorption tower 53B includes therein a second adsorbent (not shown) that adsorbs the first gas component in the raw material gas. The second adsorbent may be any material as long as it can adsorb the first gas component, and can be appropriately selected according to the first gas component. For example, when the first gas component is xenon, the second adsorbent is preferably activated carbon, Ca-A type zeolite, Na-X type zeolite, Ca-X type zeolite, Li-X type zeolite, or metal organic framework (MOF).

The second adsorption tower 53 B removes the first gas component from the raw material gas and leads out the second gas component to the secondary side of the separation unit 5. The secondary side of the second adsorption tower 53B is connected to the first end of the second separation pipe L5. The second adsorption tower 53B leads out the second gas component separated in the second separation pipe L5.

The second separation pipe L5 connects the separation unit 5 and the second separation gas container 7. The second separated gas container 7 stores the second gas component separated by the separating section 5. A first end of the second introduction pipe L7 and a first end of the second lead-out pipe L9 are connected to the second separation gas container 7.

Each of the primary sides of the first adsorption tower 53A and the second adsorption tower 53B is connected to branched first ends of the returning pipe 13. Each of back pressure valves 52A and 52B is provided at the branched first ends of the returning pipe L3. The returning pipe L3 supplies a mixed gas of the second gas component which is adsorbed by the first adsorbent and discharged from the first adsorption tower 53A, and the first gas component which is adsorbed by the second adsorbent and discharged from the second adsorption tower 53B. As explained above, the returning pipe L3 returns the mixed gas containing the first gas component and the second gas component discharged from the primary side of the separation unit 5 into the raw material gas container 3.

Each of the secondary sides of the first adsorption tower 53A and the second adsorption tower 53B is connected to each of the regeneration pipes 57A and 57B. Each of the regeneration pipes 57A and 57B is provided with each of the regeneration valves 56A and 56B. The regeneration pipes 57A and 57B supply regeneration gas for regenerating each adsorbent into the first adsorption tower 53A and the second adsorption tower 53B.

Each of the first adsorption tower 53A and the second adsorption tower 53B is provided with each of pressure gauges 54A and 54B. Each of the pressure gauges 54A and 54B measures the pressure inside each adsorption tower 53A and 53B.

The separation unit 5 may further include a pressure equalizing pipe provided with a pressure equalizing valve, like a normal pressure adsorption type gas separation device.

The separation unit 5 may be one that can separate the first gas component and the second gas component using a pressure adsorption method. The separation unit may be a plurality of adsorption towers filled with the second adsorbent which adsorbs the first gas component in the raw material gas.

As shown in FIG. 1, the second end of the first introduction pipe L6 is connected to the raw material gas container 3. Therefore, the first introduction pipe L6 can introduce the first gas component in the first separation gas container 6 into the raw material gas as the first introduction gas. However, the connection destination of the second end of the first introduction pipe L6 is not limited to the raw material gas container 3. In another embodiment, for example, the second end of the first introduction pipe L6 may be connected to the second supply pipe L2 located on the primary side of the separation unit 5 and on the primary side of the compressor 4.

A second end of the second introduction pipe L7 is connected to the raw material gas container 3. Therefore, the second introduction pipe L7 can introduce the second gas component in the second separation gas container 7 into the raw material gas as the second introduction gas. However, the connection destination of the second end of the second introduction pipe L7 is not limited to the raw material gas container 3. In another embodiment, for example, the second end of the second introduction pipe L7 may be connected to the second supply pipe L2 located on the primary side of the separation unit 5 and on the primary side of the compressor 4.

The first flow rate controller 8 is provided in the first introduction pipe L6. The first flow rate controller 8 adjusts and controls the flow rate $V_{R1}$ of the first introduced gas from the first separation gas container 6 according to the instructions of the arithmetic device 12 electrically connected.

The second flow rate controller 9 is provided in the second introduction pipe L7. The second flow rate controller 9 adjusts and controls the flow rate $V_{R2}$ of the second introduced gas from the second separation gas container 7 according to the instructions of the arithmetic device 12 electrically connected.

The first flow rate controller 8 and the second flow rate controller 9 may be any controller as long as it can control the flow rate according to the instructions of the electric signal. For example, a mass flow controller or the like can be used as the first flow rate controller 8 and the second flow rate controller 9.

The arithmetic device 12 is electrically connected to each of the first flow rate controller 8, the second flow rate controller 9, the flow rate meter 2 and the densitometer 13. The arithmetic device 12 determines and indicates the flow rate to the first flow rate controller 8 and the second flow rate controller 9 based on the flow rate $V_{F1}$ of the first gas component and the flow rate $V_{F2}$ of the second gas component in the discharged gas. The flow rates $V_{F1}$ and $V_{F2}$ are calculated from the flow rate of the discharged gas from the rare gas using facility 20, which is transmitted as an electrical signal from the flow rate meter 2, and the concentration of the first gas component or the second gas component in the discharged gas which is transmitted as an electrical signal from the densitometer 13.

If the flow rate meter 2 can measure each of the flow rates of the first gas component and the second gas component in the discharged gas, it may be possible to determine and indicate the flow rate to the first flow rate controller 8 and the second flow rate controller 9 based on each of the flow rates.

Further, if the arithmetic device 12 is electrically connected to the rare gas using facility 20, and the flow rate values of the first gas component and the second gas component in the discharged gas are transmitted as electrical signals from the rare gas using facility 20, the arithmetic device 12 may determine and indicate the flow rates to the first flow rate controller 8 and the second flow rate controller 9 based on the flow rates.

The arithmetic device 12 determines each of the amount of the first gas component introduced by the first introduction pipe L6 and the amount of the second gas component introduced by the second introduction pipe 17 so that the flow rate and the composition of the mixed gas obtained by mixing the discharged gas, the first introduced gas, and the second introduced gas which are introduced into the raw material gas container 3 are constant, and instructs the first flow rate controller 8 and the second flow rate controller 9.

The first introduction pipe L6 is provided with a first densitometer (not shown) for measuring the concentration of the first gas component in the first introduction pipe L6. When the first densitometer is electrically connected to the arithmetic device 12, the arithmetic device 12 can instruct the flow rate $V_{R1}$ of the first introduced gas based on the concentration of the first gas component in the first introduction pipe L6 to the first flow rate controller 8. As a result, the composition of the raw material gas can be more reliably and precisely controlled, and the purity and recovery of the separated gas components are more stable and improved.

The second introduction pipe L7 is provided with a second densitometer (not shown) for measuring the concentration of the second gas component in the second introduction pipe L7. When the second densitometer is electrically connected to the arithmetic device 12, the arithmetic device 12 can instruct the flow rate $V_{R2}$ of the second introduced gas flowing through the second introduction pipe L7 based on the concentration of the second gas component in the second introduction pipe L7 to the second flow rate controller 9. As a result, the composition of the raw material gas can be more reliably and precisely controlled, and the purity and recovery of the separated gas components are more stable and improved.

The first lead-out pipe L8 leads out the first gas component separated by the separation unit 5 into the rare gas using facility 20. The third flow rate controller 10 is provided in the first lead-out pipe L8. The third flow rate controller 10 adjusts and controls the flow rate $V_{O1}$ of the first gas component flowing through the first lead-out pipe L8.

The fourth flow rate controller 11 is provided in the second lead-out pipe L9. The fourth flow rate controller 11 adjusts and controls the flow rate $V_{O2}$ of the second gas component flowing through the second lead-out pipe L9. The connection destination of the second end of the second lead-out pipe L9 is not particularly limited.

Effects

The gas separation device 1 described above includes the arithmetic device 12 electrically connected to each of the first flow rate controller 8, the second flow rate controller 9, the flow rate meter 2, and the densitometer 13. Therefore, the gas separation device 1 can control the flow rate value $V_{R1}$ of the first introduced gas flowing through the first introduction pipe L6 and the flow rate value $V_{R2}$ of the second introduced gas flowing through the second introduction pipe L7 based on the flow rate VF, of the first gas component and the flow rate $V_{F2}$ of the second gas component in the discharged gas which is calculated in accordance with the flow rate measured by the flow meter 2 and the concentration measured by the densitometer 13.

Therefore, according to the gas separation device 1 of the present embodiment, even if the concentration of the second gas component in the discharged gas from the rare gas using facility 20 increases, the arithmetic device 12 can control the flow rate $V_{R1}$ and the flow rate $V_{R2}$ such that the concentration of the first gas component in the raw material gas is relatively high. Therefore, the purity of the separated first gas component is less likely to decrease.

On the other hand, according to the gas separation device 1, even if the concentration of the first gas component in the discharged gas from the rare gas using facility 20 increases, it is possible to maintain the concentration of the first gas component in the raw material gas relatively low by the arithmetic device 12. As a result, it is possible to stabilize the rare gas separation capacity of the separation unit 5 without changing the operating conditions of the pressure adsorption type separation unit. Thereby, it is possible to obtain a constant gas separation capability and a high recovery of the first gas component.

Therefore, according to the gas separation device 1 of the present embodiment, it is possible to stably increase both the purity of the rare gas after separation and the recovery rate of the rare gas while reusing the discharged gas from the rare gas using facility.

<Gas Separation Method>

The gas separation method according to the present embodiment will be described below with reference to FIGS. 1 and 2. In the gas separation method according to the present embodiment, the separation unit 5 is used for separating the first gas component and the second gas component from the raw material gas containing a plurality of gas components by pressure adsorption.

In the following description, the embodiment of the present invention will be described by taking as an example a case in which the first gas component is xenon (Xe) and the second gas component is nitrogen ($N_2$). However, the present invention is not limited to the following examples.

It is assumed that the first adsorption tower 53A carries out the adsorption step.

First, the discharged gas from the rare gas using facility 20 is supplied into the raw material gas container 3 in the adsorption step of the first adsorption tower 53A. The flow rate $V_{F1}$ of xenon and the flow rate $V_{F2}$ of nitrogen in the discharged gas are measured by the flow rate meter 2 and the measured values are sent to the arithmetic device 12. The raw material gas is pressurized to a predetermined pressure by the compressor 4 while flowing from the raw material gas container 3 through the second supply pipe L2.

The raw material gas pressurized by the compressor 4 flows through the supply valve 51A into the first adsorption tower 53A. The Na-A type zeolite filled in the first adsorption tower 53A hardly adsorbs xenon than nitrogen. Therefore, nitrogen, which is a readily adsorbable component in the raw material gas that has flowed into the first adsorption tower 53A, is preferentially adsorbed by the Na-A type zeolite. Xenon, which is a hardly adsorbable component, is separated, and the separated xenon flows from the secondary side of the adsorption tower 53A through the first separation pipe L4 and the separation valve 55A, and is stored in the first separation gas container 6.

During this time, the second adsorption tower 53B carries out the regeneration process, and the xenon adsorbed in the second adsorption tower 53B is returned into the raw material gas container 3 through the returning pipe L3 and the back pressure valve 52B.

At the time of switching between the adsorption process and the regeneration process, the pressure equalization process using a pressure equalization pipe having a pressure equalization valve and the purge regeneration process using the regeneration pipe 57B having the regeneration valve 56B are performed in the same manner as in a normal pressure adsorption separation process.

In the regeneration step of the second adsorption tower 53B, xenon desorbed from the activated carbon filled in the second adsorption tower 53B is released due to pressure drop in the second adsorption tower 53B. Therefore, the mixed gas discharged from the primary side of the separation unit 5 in the regeneration process is reused without being discharged from the gas separation device 1. Specifically, the mixed gas discharged into the returning pipe L3 is returned into the raw material gas container 3 located on the primary side of the compressor 4, mixed with the raw material gas and reused.

Before the amount of nitrogen adsorbed on the Na-A type zeolite in the first adsorption tower 53A reaches saturation and the nitrogen flows out from the secondary side of the first adsorption tower 53A, the supply valves 51A and 51B, the separation valves 55A and 55B, and the back pressure valves 52A and 52B are opened and closed to switch the processes of the adsorption towers 53A and 53B. That is, the regeneration process starts in the first adsorption tower 53A, and the adsorption process starts in the second adsorption tower 53B.

The adsorption step in the second adsorption tower 53B will be described.

The raw material gas pressurized by the compressor 4 flows through the supply valve 51B into the second adsorption tower 53B. The activated carbon filled in the second adsorption tower 53B hardly adsorbs nitrogen than xenon. Therefore, xenon, which is a readily adsorbable component in the raw material gas that has flowed into the second adsorption tower 53B, is preferentially adsorbed by the activated carbon, and nitrogen, which is a hardly adsorbable component, is separated. The separated nitrogen flows from the secondary side of the adsorption tower 53B through the second separation pipe L5 and the separation valve 55B, and is stored in the second separated gas container 7.

During this time, the first adsorption tower 53A carries out the regeneration process, and the nitrogen adsorbed in the first adsorption tower 53A flows through the returning pipe 13 and the backpressure valve 52A and is returned into the raw material gas container 3.

At the time of switching between the adsorption process and the regeneration process, the pressure equalization process using a pressure equalization pipe having a pressure equalization valve and the purge regeneration process using the regeneration pipe 57A having the regeneration valve 56A are performed in the same manner as in a normal pressure adsorption separation process.

In the regeneration step of the first adsorption tower 53A, the nitrogen desorbed from the Na-A type zeolite is released due to the pressure drop in the first adsorption tower 53A. In addition, since the xenon in the first adsorption tower 53A is also released, the mixed gas discharged from the primary side of the separation unit 5 in the regeneration process is reused without being discharged from the gas separation device 1. Specifically, the mixed gas discharged into the returning pipe L3 is returned into the raw material gas container 3 on the primary side of the compressor 4, mixed with the raw material gas and reused.

In the gas separation method according to the present embodiment, xenon, which is the first gas component after being separated from the raw material gas in the first adsorption tower 53A of the separation unit 5, is introduced into the raw material gas as the first introduction gas. Further, nitrogen, which is the second gas component after being separated from the raw material gas in the second adsorption tower 53B of the separation unit 5, is introduced into the raw material gas as the second introduced gas.

The xenon separated in the separation unit 5 flows from the first separation gas container 6 through the first introduction pipe L6 and is introduced into the raw material gas container 3 as the first introduction gas. The nitrogen separated in the separation unit 5 flows from the second separation gas container 7 through the second introduction pipe L7 and is introduced into the raw material gas container 3 as the second introduction gas.

In the gas separation method according to the present embodiment, the flow rate $V_{R1}$ of the first introduced gas is controlled based on the flow rate $V_{F1}$ of the first gas component (xenon) in the discharged gas discharged from the rare gas using facility 20. Specifically, the flow rate $V_{R1}$ of the first introduced gas is determined by the arithmetic device 12 based on the flow rate $V_{F1}$ of the first gas component (xenon) in the discharged gas. The flow rate $V_{R1}$ is adjusted and controlled by the arithmetic device 12 and the first flow rate controller 8 which is electrically connected to the arithmetic device 12.

Then, the flow rate $V_{R2}$ of the second introduced gas is controlled based on the flow rate $V_{R2}$ of the second gas component (nitrogen) in the discharged gas discharged from the rare gas using facility 20. Specifically, the flow rate $V_{R2}$ of the second introduced gas is determined by the arithmetic device 12 based on the flow rate $V_{F2}$ of the second gas component (nitrogen) in the discharged gas. The flow rate $V_{R2}$ is adjusted and controlled by the arithmetic device 12 and the first flow rate controller 8 which is electrically connected to the arithmetic device 12.

(Effects)

As described above, the gas separation method according to the present embodiment is characterized by controlling each of the flow rate $V_{R1}$ of the first introduced gas and the flow rate $V_{R2}$ of the second introduced gas based on the flow rate $V_{F1}$ of the first gas component (xenon) and the flow rate $V_{F2}$ of the second gas component (nitrogen) in the discharged gas discharged from the rare gas using facility 20.

Therefore, according to the gas separation method of the present embodiment, even if the composition of the discharged gas from the rare gas using facility 20 fluctuates, the flow rate $V_{R1}$ of the first introduced gas and the flow rate $V_{R2}$ of the second introduced gas can be adjusted so that the ratio of xenon and nitrogen in the raw material gas supplied into the separation unit 5 does not change. Therefore, according to the gas separation method of the present embodiment, at least the following effects (1) and (2) can be obtained.

(1) When the ratio of xenon in the discharged gas from the rare gas using facility 20 decreases and the ratio of nitrogen increases, fluctuations in the concentration of nitrogen to be removed in the first adsorption tower 53A can be suppressed by controlling such that the flow rate $V_{R1}$ of the first introduced gas increases and the flow rate $V_{R2}$ of the second introduced gas decreases. Therefore, the removal performance of nitrogen in the first adsorption tower 53A is stably maintained at a high level, nitrogen can be sufficiently removed, and the purity of xenon after separation is stably maintained at a high level.

(2) When the ratio of xenon in the discharged gas from the rare gas using facility 20 increases and the ratio of nitrogen decreases, fluctuations in the concentration of xenon to be removed in the second adsorption tower 53B can be suppressed by controlling such that the flow rate $V_{R1}$ of the first introduced gas decreases and the flow rate $V_{R2}$ of the second introduced gas increases. Therefore, the removal performance of xenon in the second adsorption tower 53B is stably maintained at a high level, xenon can be sufficiently removed, and the purity of nitrogen after separation is stably maintained at a high level. Since the nitrogen after separation is not reused, the amount of xenon that cannot be reused is reduced. As a result, the recovery rate of xenon is stably maintained at a high level.

Since the effects of (1) and (2) are obtained, even if the composition of the discharged gas from the rare gas using facility 20 changes, the composition of the raw material gas can be stably maintained. Therefore, it is not necessary to change the operating conditions of the separation unit 5 in accordance with fluctuations in the composition of the discharged gas. Further, even if the concentration of the rare gas (first gas component) in the discharged gas from the rare gas using facility 20 fluctuates within the range of 0 to 100% by volume, the flow rate $V_{R1}$ of the first introduced gas and the flow rate $V_{R2}$ of the second introduced gas can be controlled by the arithmetic device 12. Therefore, both the purity and recovery rate of the rare gas can be stably increased.

Furthermore, in the gas separation method according to the present embodiment, it is preferable to control the following total gas flow rate S1 and total gas flow rate S2 to constant values. For example, the following effect (3) can be further obtained by controlling the total gas flow rate S1 and the total gas flow rate S2 to constant values by the arithmetic device 12.

Total gas flow rate S1: total of the flow rate $V_{F1}$ of xenon in the discharged gas and the flow rate $V_{R1}$ of the first introduced gas Total gas flow rate S2: total of the flow rate $V_{F2}$ of nitrogen in the discharged gas and the flow rate $V_{R2}$ of the second introduced gas (3) The separated xenon as the first introduction gas and the separated nitrogen as the second introduction gas can be introduced into the raw material gas. Therefore, the gas separation device can be operated in accordance with rapid changes in the composition and flow rate of the discharged gas from the rare gas using facility 20. Therefore, there is no need to suddenly change the separation conditions of the separation unit 5 according to fluctuations in the discharged gas from the rare gas using facility 20.

According to the gas separation method using the gas separation device 1 of the present embodiment, the following effects (4) and (5) are obtained in addition to the effects (1) to (3) above.

(4) Since the gas separation device 1 includes the first introduction pipe L6 and the second introduction pipe L7, it can cope with sudden start and stop operations of the rare gas using facility 20.

In the present embodiment, the flow rate $V_{O1}$ of xenon in the first lead-out pipe L8 and the flow rate $V_{O2}$ of nitrogen in the second lead-out pipe L9 can be adjusted and controlled by the third flow rate controller 10 and the fourth flow rate controller 11. Therefore, if both the flow rate $V_{O1}$ of xenon and the flow rate $V_{O2}$ of nitrogen are set to 0 in accordance with the shutdown of the rare gas using facility 20, the gas separation device 1 can be operated using the first introduction pipe L6 and the second introduction pipe L7 as bypass paths.

In a general gas separation device, when the gas separation device is started from a stopped state, a preparatory period by supplying raw material gas is required until the predetermined performance is obtained and the rare gas of high purity is prepared. On the other hand, in the gas separation device 1 according to the present embodiment, even if the rare gas using facility 20 suddenly stops and the rare gas is not used, the gas separation device 1 can continue to operate without stopping, and rare gas having high purity is always available. Therefore, according to the gas separation device 1, the supply of the rare gas can be restarted as soon as the rare gas using facility 20 is restored. As a result, the start-up time of the gas separation device 1 for preparing the rare gas having high purity is eliminated.

(5) The gas separation device 1 includes the raw material container 3, the first separation gas container 6, the second separation gas container 7, the first introduction pipe L6, and the second introduction pipe L7. For this reason, the gas separation device 1 does not require the raw material gas that is required during the period from when a general gas separation device starts up to prepare a high-purity rare gas, and makes economical use of the precious rare gas.

In a case of a gas separation device without the raw material container 3, the first separation gas container 6, the second separation gas container 7, the first introduction pipe L6 and the second introduction pipe L7, in order to prepare the rare gas having high purity during the preparatory period, the rare gas separated from the raw material gas is wasted until the desired separation performance is reached.

On the other hand, when the gas separation device 1 of the present embodiment is started from a stopped state, the rare gas separated from the raw material gas can be circulated back into the raw material gas container 3 through the first introduction pipe L6 until the gas separation device 1 reaches a predetermined separation performance. Therefore, there is no need to discharge precious rare gas, which is economically advantageous. In addition, the supply of the discharged gas from the ram gas using facility 20 during start-up operations is also eliminated.

Second Embodiment

The gas separation device and gas separation method according to the present embodiment will be described below with reference to FIG. 3.

Figure 3:
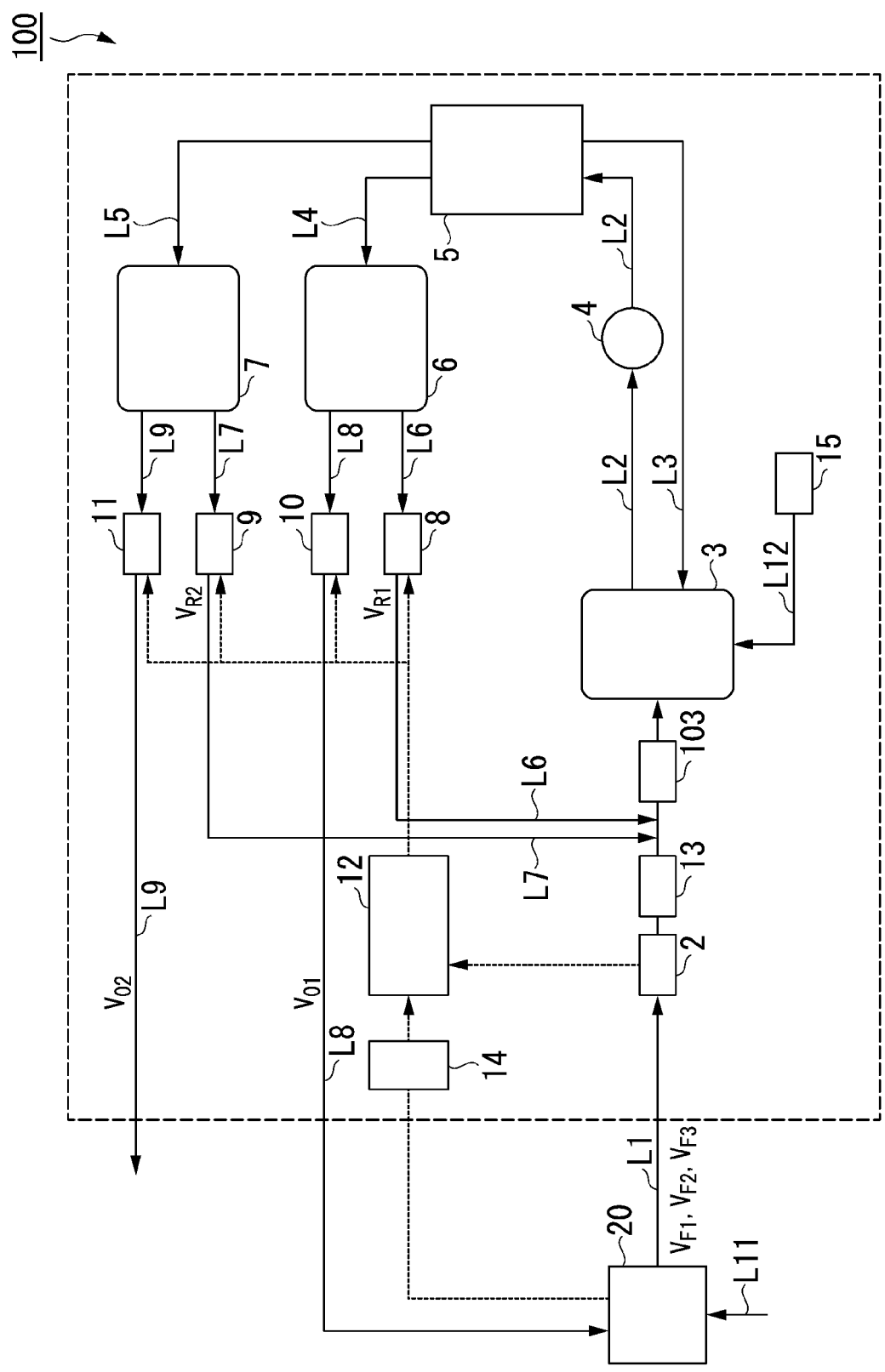
FIG. 3 is a schematic diagram showing a gas separation device according to a second embodiment and a rare gas using facility.

FIG. 3 is a schematic diagram showing a gas separation device 100 according to the present embodiment and a rare gas using facility 20 that uses rare gas.

The gas separation device 100 of the present embodiment differs from the gas separation device 1 of the first embodiment in the following points.

First difference: the gas separation device 100 of the present embodiment includes a third gas component removal device, which the gas separation device 1 of the first embodiment does not include Second difference: In the gas separation device 1 of the first embodiment, the second ends of the first introduction pipe L6 and the second introduction pipe L7 are connected to the raw material gas container 3, whereas the gas separation device 100 of the present embodiment is different in that it is connected to the first supply pipe L1.

These differences will be described in detail below.
Regarding the first difference:
In the gas separation device 100 of the present embodiment, the third gas component, which is a trace component contained in the discharged gas from the rare gas using facility 20, is removed by the third gas component removal device 103.

The third gas component is a component other than the first gas component and the second gas component. As the third gas component, an organic compound is exemplified.

The organic compound is not particularly limited as long as it is discharged from a rare gas using facility and mixed into raw material gas, but examples thereof includes chain or cyclic hydrocarbon compounds, alcohols, carbonyl compounds, organic fluorine compounds.

Examples of chain or cyclic hydrocarbon compounds include chain or cyclic hydrocarbon compounds having 1 to 15 carbon atoms, such as methane, ethane, propane, n-butane, i-butane, n-pentane, i-pentane, neopentane, hexane, heptane, octane, nonane, decane, undecane, dodecane, tridecane, tetradecane, pentadecane, cyclopropane, cyclobutane, cyclopentane, benzene, naphthalene and the like.

Examples of the organic fluorine compound include fluorocarbons such as fluoromethane, difluoromethane, trifluoromethane, trichlorofluoromethane, chlorofluorocarbon, tetrafluoromethane, dichlorodifluoromethane, chlorodifluoromethane, tetrachlorodifluoroethane, dichlorofluoroethane, chlorodifluoroethane, and difluoroethane and the like.

In the present embodiment, it is preferred that the third gas component is a hydrocarbon compound, such as a chain or cyclic hydrocarbon compound, or an organic fluorine compound.

The third gas component removal device 103 is provided in the first supply pipe L1 located on the secondary side of the densitometer 13 and on the primary side of the raw material gas container 3. Therefore, the discharged gas from the rare gas using facility 20 flows through the first supply pipe L1 via the flow rate meter 2 and the densitometer 13 and is introduced into the third gas component removal device 103. The third gas component removing device 103 is not particularly limited as long as it can remove the third gas component, but examples thereof include an adsorption removal device. When the third gas component is a hydrocarbon compound or an organic fluorine compound, the third gas component removal device 103 is preferably an adsorption removal tower using activated carbon.

Regarding the second difference:
The second end of the first introduction pipe L6, which allows the first gas component stored in the first separation gas container 6 to flow through the first flow rate controller 8, is connected to the first supply pipe L1. More specifically, the second end of the first introduction pipe L6 is connected to the first supply pipe L1 positioned between the densitometer 13 and the third gas component removal device 103.

The second end of the second introduction pipe L7, which allows the second gas component stored in the second separation gas container 7 to flow through the second flow rate controller 9, is connected to the first supply pipe L1. More specifically, the second end of the second introduction pipe L7 is connected to the first supply pipe L1 located between the densitometer 13 and the third gas component removal device 103.

Since the gas separation device 100 of the present embodiment has the configuration related to the differences 1 and 2, the discharged gas from which the third gas component has been removed by the third gas component removal device 103 is stored in the raw material gas container 3.

The first gas component stored in the first separation gas container 6 flows through the first introduction pipe L6 via the first flow rate controller 8, joins the discharged gas flowing through the first supply pipe L1, and then is introduced into the third gas component removal device 103.

The second gas component stored in the second separation gas container 7 flows through the second introduction pipe L7 via the second flow rate controller 9, joins the discharged gas flowing through the first supply pipe L1, and then is introduced into the three-gas component removal device 103.

(Effects)
According to the gas separation device 100 and the gas separation method of the present embodiment, the following effects can be obtained in addition to the effects of the gas separation device 1 and the gas separation method of the first embodiment.

Even if the condition (flow rate, composition) of the raw material gas change, the third gas component which is a trace component can be removed more stably.

The raw material gas conditions (flow rate, concentration of the rare gas) change depending on the operating conditions of the facility using rare gas.

Adsorbents (pretreatment adsorbents, generally activated carbon, and the like) that remove trace components strongly adsorb not only trace components but also rare gases (especially xenon). Therefore, the temperature rises or falls by the heat of adsorption due to changes in the rare gas concentration (for example, changes from 0 to 100%). For example, when the concentration of the rare gas changes from 0% to 100%, it is assumed that the temperature of the adsorbent will be 100° C. or higher. Since the adsorption performance of the adsorbent is strongly affected by temperature, this change in temperature has such an effect that the adsorption of trace components, which is the original purpose, cannot be sufficiently achieved.

On the other hand, in the gas separation device 100 and the gas separation method of the second embodiment, after adjusting the flow rate $V_{R1}$ of the first introduced gas and the flow rate $V_{R2}$ of the second introduced gas, the first gas component is introduced from the first introduction pipe L6, and the second gas component is introduced from the second introduction pipe L7 into the first supply pipe L1. Thus, even if the composition of the discharged gas from the rare gas using facility 20 fluctuates, the concentration of the first gas component (rare gas) in the raw material gas introduced into the third gas removal device 103 will not fluctuate.

Therefore, temperature change of the adsorbent in the third gas removal device 103 is less likely to occur, and fluctuations in adsorption performance are reduced. As a result, the third gas removal device 103 can stably remove trace impurities.

Since the discharged gas supplied from the first supply pipe L1 is mixed with the first gas component (rare gas) and second gas component ($N_2$, and the like) which have once separated and purified, the concentration of impurity components contained in the discharged gas further decreases. The adsorbent capacity of the third gas removal device can be preserved because the concentration of impurities to be removed is reduced.

Although several embodiments of the present invention have been described above, the present invention is not limited to such specific embodiments. Further, additions, omissions, substitutions, and other changes in configuration may be made to the present invention within the scope of the gist of the present invention described in the claims.

In the present embodiment, the flow rate information acquisition device in FIG. 1 includes the flow rate meter 2 and the densitometer 13 (the first densitometer that measures the concentration of the first gas component and the second densitometer that measures the concentration of the second gas component), but the present invention is not limited to this embodiment. For example, if the rare gas using facility 20 is equipped with devices capable of measuring the flow rate $V_{F1}$ of the first gas component and the flow rate $V_{F2}$ of the second gas component, and if the arithmetic device 12 includes a receiver that electrically receives these information, the receiver can be the flow rate information acquisition device. Further, if the rare gas using facility 20 is equipped with a device capable of measuring the flow rate $V_{F1}$ of the first gas component or the flow rate $V_{F2}$ of the second gas component, the flow rate meter 2 and a receiver that electrically receives the information of the flow rate $V_{F1}$ of the first gas component or the flow rate $V_{F2}$ of the second gas component of the arithmetic device 12 constitute the flow rate information acquisition device.

When the flow rate meter 2 is required to measure the flow rate of the first gas component and the second gas component in the mixed gas, the flow rate meter 2 alone may serve as the flow rate information acquisition device.

EXAMPLES

The present invention will be specifically described below with reference to Examples, but the present invention is not limited by the following description.

Example 1

The gas separation device 1 shown in FIG. 1 was constructed. The gas separation device 1 used in Example 1 has the separation unit 5 shown in FIG. 2.

The details of the configuration of the gas separation device used in Example 1 are as follows.

Compressor 4: The flow rate of the gas discharged from the compressor was set to 26 L/min under the conditions of 0° C. and 1 atmospheric pressure.

First adsorption tower 53A: An adsorption tower having an inner diameter of 154 mm and a length of 650 mm, and filled with 8.8 kg of Na-A zeolite.

Second adsorption tower 53B: An adsorption tower having an inner diameter of 108 mm and a length of 650 mm, and filled with 2.7 kg of activated carbon.

First, a mixed gas having the following composition 1 which is assumed to be discharged gas from a rare gas using facility was used as the raw material gas, and xenon as the first gas component and nitrogen as the second gas component were separated from the raw material gas.

Composition 1: Mixed gas of Xe and $N_2$ (Xe concentration: 33% by volume, $N_2$ concentration: 67% by volume)

Flow rate of discharged gas having composition 1: 1.5 NL/min

When separating the raw material gas which is the discharged gas having composition 1, the first introduction gas (Xe) was not introduced into the raw material gas by the first introduction pipe L6, and the second introduction gas ($N_2$) was not introduced into the raw material gas by the second introduction pipe l7. In addition, the flow rate $V_{O1}$ of Xe supplied into the rare gas using facility 20 was controlled at 0.5 NL/min. and the flow ratec $V_{O2}$ of $N_2$ was controlled at 1.0 NL/min.

The separation results of the discharged gas having composition 1 as the raw material gas in Example 1 are shown below.

Xe purity in the first lead-out pipe L8: 99.993% by volume $N_2$ concentration as an impurity in the first lead-out pipe L8: 70 ppm by volume $N_2$ purity in the second lead-out pipe L9: 99.988% by volume Xe concentration as an impurity in the second lead-out pipe L9: 120 ppm by volume Xe recovery rate: 99.98%.

Next, the composition of the mixed gas assuming the discharged gas of a rare gas using facility was changed from Composition 1 to Composition 2 below. This experiment was conducted assuming changes in the composition of the discharged gas. The flow rate of the gas discharged from the compressor and the switching time between the adsorption process and the regeneration process were set to the same values those of the separation above.

Composition 2: Mixed gas of Xe and $N_2$ (Xe concentration: 50% by volume, $N_2$ concentration: 50% by volume)

Flow rate of discharged gas having composition 2: 1.0 NL/min

When separating the raw material gas which is the discharged gas having composition 2, based on the flow rates of Xe and $N_2$ in the discharged gas, each of the flow rates was adjusted such that the flow rate $V_{R1}$ of the first introduced gas (Xe) through the first introduction pipe L6 was 0 NL/min, and the flow rate $V_{R2}$ of the second introduced gas ($N_2$) through the second introduction pipe L7 was 0.5 NL/min. In addition, the flow rate $V_{O1}$ of Xe supplied into the rare gas using facility 20 was controlled at 0.5 NL/min, and the flow rate $V_{O2}$ of $N_2$ was controlled at 0.5 NL/min.

The separation results of the raw material gas which is the discharged gas having composition 2 in Example 1 are shown below. As shown below, even when the composition of the raw material gas was changed from composition 1 to composition 2, the Xe recovery rate could be increased while maintaining the high purity of Xe.

Xe purity in the first lead-out pipe L8: 99.993% by volume $N_2$ concentration as an impurity in the first lead-out pipe L8: 70 ppm by volume $N_2$ purity in the second lead-out pipe L9: 99.988% by volume Xe concentration as an impurity in the second lead-out pipe L9: 120 ppm by volume Xe recovery rate: 99.99%

Next, the composition of the mixed gas assuming the discharged gas from a rare gas using facility was changed to composition 3 below. The flow rate of the gas discharged from the compressor and the switching time between the adsorption process and the regeneration process were set to the same values as those of the separations above.

Composition 3: Mixed gas of Xe and $N_2$ (Xe concentration: 1% by volume, $N_2$ concentration: 99% by volume)

Flow rate of discharged gas having composition 3: 1.0 NL/min

When separating the raw material gas which is the discharged gas having composition 3, based on the flow rates of Xe and $N_2$ in the discharged gas, each of the flow rates was adjusted such that the flow rate $V_{R1}$ of the first introduced gas (Xe) through the first introduction pipe L6 was 0.49 NL/min, and the flow rate $V_{R2}$ of the second introduced gas ($N_2$) through the second introduction pipe L7 was 0.01 NL/min. In addition, the flow rate $V_{O1}$ of Xe supplied into the rare gas using facility 20 was controlled at 0.01 NL/min, and the flow rate $V_{O2}$ of $N_2$ was controlled at 0.99 NL/min.

The separation results of the raw material gas which is the discharged gas having composition 3 are shown below. As shown below, even when the composition of the raw material gas was changed from composition 2 to composition 3, the purity and recovery rate of Xe could be maintained at a high level.

Xe purity in the first lead-out pipe L8: 99.993% by volume $N_2$ concentration as an impurity in the first lead-out pipe L8: 70 ppm by volume $N_2$ purity in the second lead-out pipe L9: 99.988% by volume Xe concentration as an impurity in the second lead-out pipe L9: 120 ppm by volume Xe recovery rate: 98.8%

Comparative Example 1

In Comparative Example 1, a separation device was constructed in the same manner as in Example 1, except that the arithmetic device 12, the first introduction pipe L6, and the second introduction pipe L7 were not provided.

Using the mixed gas having the following composition 1, which is assumed to be the discharged gas from the rare gas using facility in Example 1, xenon (Xe) as the first gas component and nitrogen ($N_2$) as the second gas component were separated from the raw material gas.

Also in Comparative Example 1, when separating the discharged gas having composition 1, the flow rate $V_{O1}$ of Xe supplied into the rare gas using facility 20 was controlled to 0.5 NL/min, and the flow rate $V_{O2}$ of $N_2$ was controlled to 1.0 NL/min.

Composition 1: Mixed gas of Xe and $N_2$ (Xe concentration: 33% by volume, $N_2$ concentration: 67% by volume)

Flow rate of raw material gas having composition 1:1.5 NL/min

The separation results of the raw material gas which is the discharged gas having composition 1 in Comparative Example 1 are shown below. The separation results were consistent with the separation results of the raw material gas having composition 1 in Example 1 in which the first introduced gas (Xe) and the second introduced gas ($N_2$) were not introduced into the raw material gas.

Xe purity in the first lead-out pipe L8: 99.993% by volume $N_2$ concentration as an impurity in the first lead-out pipe L8: 70 ppm by volume $N_2$ purity in the second lead-out pipe L9: 99.988% by volume Xe concentration as an impurity in the second lead-out pipe L9: 120 ppm by volume Xe recovery rate: 99.98%

Next, xenon (Xe) was separated as the first gas component and nitrogen ($N_2$) was separated as the second gas component from the mixed gas having the following composition 2, which is assumed to be the discharged gas from the rare gas using facility used in Example 1. Also in Comparative Example 1, when separating the discharged gas having composition 2, the flow rate $V_{O1}$ of Xe supplied into the rare gas using facility 20 was controlled to 0.5 NL/min, and the flow rate $V_{O2}$ of $N_2$ was controlled to 0.5 NL/min.

The flow rate of the gas discharged from the compressor and the switching time between the adsorption process and the regeneration process were set to the same values as those of the separation above.

Composition 2: Mixed gas of Xe and $N_2$ (Xe concentration: 50% by volume, $N_2$ concentration: 50% by volume)

Flow rate of raw material gas having composition 2:1.0 NL/min

The separation results of the raw material gas which is the discharged gas having composition 2 of Comparative Example 1 are shown below.

Xe purity in the first lead-out pipe L8: 99.9990% by volume $N_2$ concentration as an impurity in the first lead-out pipe L8: 10 ppm by volume $N_2$ purity in the second lead-out pipe L9: 99.6770% by volume Xe concentration as an impurity in the second lead-out pipe L9: 3230 ppm by volume Xe recovery rate: 99.68%

In Comparative Example 1, when the separation of the raw material gas which is the discharged gas having composition 2 was continued, the raw material gas in the raw material container 3 became insufficient and the flow rate of the gas discharged from the compressor 4 decreased. As a result, the pressure in the adsorption tower during the adsorption step was lowered.

Next, using the mixed gas having the following composition 3, which is assumed to be the discharged gas from the rare gas using facility in Example 1, xenon (Xe) as the first gas component, and nitrogen ($N_2$) as the second gas component were separated from the raw material gas.

Also in Comparative Example 3, when separating the discharged gas having composition 3, the flow rate $V_t$ of Xe supplied into the rare gas using facility 20 was controlled to 0.01 NL/min, and the flow rate $V_{O2}$ of $N_2$ was controlled to 0.99 NL/min.

Composition 3: Mixed gas of Xe and $N_2$ (Xe concentration: 1% by volume, $N_2$ concentration: 99% by volume) Flow rate of raw material gas having composition 3:1.0 NL/min The separation results of the raw material gas which is the discharged gas having composition 3 in Comparative Example 1 are shown below.

Xe purity in the first lead-out pipe L8: 99.148% by volume $N_2$ concentration as an impurity in the first lead-out pipe L8: 8520 ppm by volume $N_2$ purity in the second lead-out pipe L9: 99.6770% by volume Xe concentration as an impurity in the second lead-out pipe L9: 100 ppm by volume Xe recovery rate: 99.01%

As in the separation of the raw material gas which is the discharged gas having the composition 2 in Comparative Example 1, when the raw material gas was continuously separated, the raw material gas in the raw material container 3 became insufficient, and the flow rate of the gas discharged from the compressor 4 decreased. As a result, the pressure in the adsorption tower during the adsorption step was lowered.

In Comparative Example 1, the recovery rate of Xe decreased as the composition of the discharged gas sequentially changed to Composition 1, Composition 2, and Composition 3. In addition, the purity of Xe in the first lead-out pipe L8 also fluctuated, and the separation performance was not stable due to changes in the composition of the gas components of the discharged gas.

Example 2

The gas separation device 100 shown in FIG. 3 was constructed. The gas separation device 1 used in Example 2 has a separation unit 5 shown in FIG. 2.

The details of the configuration of the gas separation device 100 used in Example 2 is as follows.

Compressor 4: The flow rate of the gas discharged from the compressor was set to 26 L/min under the conditions of 0° C. and 1 atmospheric pressure.

First adsorption tower 53A: An adsorption tower having an inner diameter of 108 nm and a length of 650 mm, and filled with 2.7 kg of activated carbon.

Second adsorption tower 53B: An adsorption tower having an inner diameter of 154 mm and a length of 650 mm, and filled with 8.8 kg of Na-A type zeolite.

Third gas component removal device 103: Adsorption removal tower using activated carbon First, xenon as the first gas component, nitrogen as the second gas component, and n-butane (n-$C_4H_{10}$) as the third gas component were separated from a mixed gas having the following composition 4 below and is assumed to be the discharged gas from a rare gas using facility as the raw material gas.

Composition 4: Mixed gas of Xe, $N_2$ and n-butane (n-$C_4H_{10}$) (Xe concentration: 1% by volume, $N_2$ concentration: 99% by volume, n-butane (n-$C_4H_{10}$) concentration: 100 ppm by volume)

Flow rate of discharged gas having composition 4: 1.0 NL/min

When separating the raw material gas which is the discharged gas having composition 4, based on the flow rates of Xe and $N_2$ in the discharged gas, each flow rates were adjusted such that the flow rate $V_{R1}$ of the first introduced gas (Xe) through the first introduction pipe L6 was 0.49 NL/min, and the flow rate $V_{R2}$ of the second introduced gas ($N_2$) through the second introduction pipe L7 was 0.01 NL/min. In addition, the flow rate $V_{O1}$ of Xe supplied into the rare gas using facility 20 was controlled at 0.01 NL/min, and the flow rate $V_{O2}$ of $N_2$ was controlled at 0.99 NL/min.

The separation results of the discharged gas having composition 4 in Example 2 are shown below.

Xe purity in the first lead-out pipe L8: 99.993%

$N_2$ concentration as an impurity in the first lead-out pipe L8: 70 ppm by volume n-butane (n-$C_4H_{10}$) concentration as an impurity in the first lead-out pipe L8:

less than 1 ppm by volume $N_2$ purity in the second lead-out pipe L9: 99.988% by volume Xe concentration as an impurity in the second lead-out pipe L9: 120 ppm by volume Xe recovery rate: 98.8%

The temperature of the third gas removal device 103 was 25° C.

Next, the composition of the mixed gas assuming the discharged gas from a rare gas using facility was changed from Composition 4 to Composition 5 below. The flow rate of the gas discharged from the compressor and the switching time between the adsorption process and the regeneration process were set to the same value as those of the separation above.

Composition 5: Mixed gas of Xe, $N_2$ and n-butane (n-$C_4H_{10}$) (Xe concentration: 50% by volume, $N_2$ concentration: 50% by volume, n-butane (n-$C_4H_{10}$) concentration: 100 ppm by volume)

Flow rate of discharged gas having composition 5: 1.0 NL/min

When separating the raw material gas which is the discharged gas having composition 5, based on the flow rates of Xe and $N_2$ in the discharged gas, each of the flow rates was adjusted such that the flow rate $V_{R1}$ of the first introduced gas (Xe) through the first introduction pipe L6 was 0.NL/min, and the flow rate $V_{R2}$ of the second introduced gas ($N_2$) through the second introduction pipe L7 was 0.5 NL/min. In addition, the flow rate $V_{O1}$ of Xe supplied into the rare gas using facility 20 was controlled at 0.5 NL/min, and the flow rate $V_{O2}$ of $N_2$ was controlled at 0.5 NL/min.

The separation results of the raw material gas which is the discharged gas having composition 5 in Example 2 are shown below. As shown below, even when the composition of the raw material gas was changed from composition 4 to composition 5, the Xe recovery rate could be increased while maintaining the high purity of Xe.

Xe purity in the first lead-out pipe L8: 99.993% by volume $N_2$ concentration as an impurity in the first lead-out pipe L8: 70 ppm by volume n-butane (n-$C_4H_{10}$) concentration as an impurity in the first lead-out pipe L8:

less than 1 ppm by volume $N_2$ purity in the second lead-out pipe L9: 99.988% by volume Xe concentration as an impurity in the second lead-out pipe L9: 120 ppm by volume Xe recovery rate: 99.99%

The temperature of the third gas removal device 103 was 25° C.

Comparative Example 2

In Comparative Example 2, a separation device was constructed in the same manner as in Example 2, except that the arithmetic device 12, the first introduction pipe L6, and the second introduction pipe L7 were not provided.

A mixed gas having the following composition 5, which is assumed to be the discharged gas from the rare gas using facility used in Example 2 was used as the raw material gas, xenon (Xe) as the first gas component, nitrogen ($N_2$) as the second gas component, and n-butane (n-$C_4H_{10}$) as the third gas component were separated from the raw material gas.

Also in Comparative Example 2, when separating the discharged gas having composition 5, the flow rate $V_{01}$ of Xe supplied into the rare gas using facility 20 was controlled to 0.5 NL/min, and the flow rate $V_{02}$ of $N_2$ was controlled to 0.5 NL/min.

Composition 5: Mixed gas of Xe, $N_2$, and n-butane (n-$C_4H_{10}$) (Xe concentration: 50% by volume, $N_2$ concentration: 50% by volume, n-butane (n-$C_4H_{10}$) concentration: 100 ppm by volume)

Flow rate of raw material gas having composition 5:1.0 NL/min

The separation results of the discharged gas having composition 5 as the raw material gas in Comparative Example 2 are shown below.

Xe purity in the first lead-out pipe L8: 99.9990% by volume $N_2$ concentration as an impurity in the first lead-out pipe L8: 10 ppm by volume n-butane (n-$C_4H_{10}$) concentration as an impurity in the first lead-out pipe L8:

3.5 ppm by volume

Xe concentration as an impurity in the second lead-out pipe L9: 3230 ppm by volume $N_2$ purity in the second lead-out pipe L9: 99.6770% by volume Xe recovery rate: 99.68%

The temperature of the third gas removal device 103 was 67° C.

In Comparative Example 2, the temperature of the third gas removal device 103 was so high that removal of n-butane (n-$C_4H_{10}$) was difficult, and the concentration of n-butane (n-$C_4H_{10}$) was high.

EXPLANATION OF REFERENCE NUMERALS 1, 100 gas separation device
2 flow rate meter
3 raw material gas container
4 compressor
5 separation unit
6 first separation gas container
7 second separation gas container
8 first flow rate controller
9 second flow rate controller
10 third flow rate controller
11 fourth flow rate controller
12 arithmetic device
13 densitometer
14 receiver
15 first gas supply source
20 gas using facility
51A, 51B supply valve
52A, 52B back pressure valve
53A, 53B adsorption tower
54A, 54B pressure gauge
55A, 55B separation valve
56A, 56B regeneration valve
57A, 57B regeneration pipe
L1 first supply pipe
L2 second supply pipe
L3 returning pipe
L4 first separation pipe
L5 second separation pipe
L6 first introduction pipe
L7 second introduction pipe
L8 first lead-out pipe
L9 second lead-out pipe
L11 third supply pipe
L12 replenishment pipe
103 third gas removal device.

The invention claimed is:

1. A gas separation method in which a first gas component and a second gas component are separated from a raw material gas containing a plurality of gas components using a gas separation device,
wherein the gas separation device includes:
a separation unit that comprises an adsorption tower, and separates the first gas component and the second gas component from the raw material gas containing a plurality of gas components by pressure adsorption;
a raw material gas container that stores the raw material gas;
a first supply pipe that supplies a discharged gas discharged from a rare gas using facility into the raw material gas container;
a second supply pipe that connects the raw material gas container and the separation unit;
a first separated gas container that stores the first gas component separated by the separation unit;
a second separated gas container that stores the second gas component separated by the separation unit;
a first introduction pipe that introduces the first gas component in the first separated gas container as a first introduction gas into the raw material gas;
a second introduction pipe that introduces the second gas component in the second separated gas container as a second introduction gas into the raw material gas;
a first flow rate controller that is provided in the first introduction pipe;
a second flow rate controller that is provided in the second introduction pipe;
a gas component information acquisition device that acquires information of the first gas component and the second gas component which flow through the first supply pipe; and
an arithmetic device that is electrically connected to each of the first flow rate controller, the second flow rate controller, and the gas component information acquisition device,
wherein the gas component information acquisition device comprises:
a flow rate meter provided in the first supply pipe, and
at least one selected from a group consisting of a densitometer that is provided in the first supply pipe and measures the concentration of the first gas component, and a densitometer that is provided in the first supply pipe and measures the concentration of the second gas component, wherein the gas separation method comprises an introduction step in which the first gas component separated from the raw material gas is introduced as a first introduced gas into the raw material gas, and the second gas component separated from the raw material gas is introduced as a second introduced gas into the raw material gas, and wherein, based on each of flow rates of the first gas component and the second gas component in the discharged gas, which are obtained by the gas component information acquisition device in the introduction step, each of total gas flow rate S1 and total gas flow rate S2 as shown below is controlled to be constant, Total gas flow rate S1: total of a flow rate $V_{F1}$ of the first gas component in the discharged gas and the flow rate $V_{R1}$ of the first introduced gas Total gas flow rate S2: total of a flow rate $V_{F2}$ of the second gas component in the discharged gas and the flow rate $V_{R2}$ of the second introduced gas.

2. A gas separation method in which a first gas component and a second gas component are separated from a raw material gas containing a plurality of gas components using a gas separation device, wherein the gas separation device includes:
a separation unit that comprises an adsorption tower, and separates the first gas component and the second gas component from the raw material gas containing a plurality of gas components by pressure adsorption;
a raw material gas container that stores the raw material gas;
a first supply pipe that supplies a discharged gas discharged from a rare gas using facility into the raw material gas container;
a second supply pipe that connects the raw material gas container and the separation unit;
a first separated gas container that stores the first gas component separated by the separation unit;
a second separated gas container that stores the second gas component separated by the separation unit;
a first introduction pipe that introduces the first gas component in the first separated gas container as a first introduction gas into the raw material gas;
a second introduction pipe that introduces the second gas component in the second separated gas container as a second introduction gas into the raw material gas;
a first flow rate controller that is provided in the first introduction pipe;
a second flow rate controller that is provided in the second introduction pipe;
a gas component information acquisition device that acquires information of the first gas component and the second gas component which flow through the first supply pipe; and
an arithmetic device that is electrically connected to each of the first flow rate controller, the second flow rate controller, and the gas component information acquisition device, wherein the gas component information acquisition device comprises:
a flow rate meter provided in the first supply pipe, and
at least one selected from the group consisting of a receiver that electrically receives from the rare gas using facility the flow rate information of the first gas component discharged from the rare gas using facility, and a receiver that electronically receives from the rare gas using facility the flow rate information of the second gas component discharged from the rare gas using facility, wherein the gas separation method comprises an introduction step in which the first gas component separated from the raw material gas is introduced as a first introduced gas into the raw material gas, and the second gas component separated from the raw material gas is introduced as a second introduced gas into the raw material gas, and wherein, based on each of flow rates of the first gas component and the second gas component in the discharged gas, which are obtained by the gas component information acquisition device in the introduction step, each of total gas flow rate S1 and total gas flow rate S2 as shown below is controlled to be constant, Total gas flow rate S1: total of a flow rate $V_{F1}$ of the first gas component in the discharged gas and the flow rate $V_{R1}$ of the first introduced gas Total gas flow rate S2: total of a flow rate $V_{F2}$ of the second gas component in the discharged gas and the flow rate $V_{R2}$ of the second introduced gas.

3. A gas separation method in which a raw material gas containing a first gas component, a second gas component, and inevitable impurities is separated using a gas separation device, wherein the gas separation device includes:
a separation unit that comprises an adsorption tower, and separates the first gas component and the second gas component from the raw material gas containing a plurality of gas components by pressure adsorption;
a raw material gas container that stores the raw material gas;
a first supply pipe that supplies a discharged gas discharged from a rare gas using facility into the raw material gas container;
a second supply pipe that connects the raw material gas container and the separation unit;
a first separated gas container that stores the first gas component separated by the separation unit;
a second separated gas container that stores the second gas component separated by the separation unit;
a first introduction pipe that introduces the first gas component in the first separated gas container as a first introduction gas into the raw material gas;
a second introduction pipe that introduces the second gas component in the second separated gas container as a second introduction gas into the raw material gas;
a first flow rate controller that is provided in the first introduction pipe;
a second flow rate controller that is provided in the second introduction pipe;
a gas component information acquisition device that acquires information of the first gas component and the second gas component which flow through the first supply pipe; and
an arithmetic device that is electrically connected to each of the first flow rate controller, the second flow rate controller, and the gas component information acquisition device, wherein the gas component information acquisition device comprises:
at least one selected from a group consisting of a densitometer that is provided in the first supply pipe and measures the concentration of the first gas component, and a densitometer that is provided in the first supply pipe and measures the concentration of the second gas component, and at least one selected from the group consisting of a receiver that electrically receives from the rare gas using facility the flow rate information of the first gas component discharged from the rare gas using facility, and a receiver that electronically receives from the rare gas using facility the flow rate information of the second gas component discharged from the rare gas using facility, wherein the gas separation method comprises an introduction step in which the first gas component separated from the raw material gas is introduced as a first introduced gas into the raw material gas, and the second gas component separated from the raw material gas is introduced as a second introduced gas into the raw material gas, and wherein, based on each of flow rates of the first gas component and the second gas component in the discharged gas, which are obtained by the gas component information acquisition device in the introduction step, each of total gas flow rate S1 and total gas flow rate S2 as shown below is controlled to be constant, Total gas flow rate S1: total of a flow rate $V_{F1}$ of the first gas component in the discharged gas and the flow rate $V_{R1}$ of the first introduced gas Total gas flow rate S2: total of a flow rate $V_{F2}$ of the second gas component in the discharged gas and the flow rate $V_{R2}$ of the second introduced gas.

4. A gas separation method in which a first gas component and a second gas component are separated from a raw material gas containing a plurality of gas components using a gas separation device, wherein the gas separation device includes:

a separation unit that comprises an adsorption tower, and separates the first gas component and the second gas component from the raw material gas containing a plurality of gas components by pressure adsorption;

a raw material gas container that stores the raw material gas;

a first supply pipe that supplies a discharged gas discharged from a rare gas using facility into the raw material gas container;

a second supply pipe that connects the raw material gas container and the separation unit;

a first separated gas container that stores the first gas component separated by the separation unit;

a second separated gas container that stores the second gas component separated by the separation unit;

a first introduction pipe that introduces the first gas component in the first separated gas container as a first introduction gas into the raw material gas;

a second introduction pipe that introduces the second gas component in the second separated gas container as a second introduction gas into the raw material gas;

a first flow rate controller that is provided in the first introduction pipe;

a second flow rate controller that is provided in the second introduction pipe;

a gas component information acquisition device that acquires information of the first gas component and the second gas component which flow through the first supply pipe; and an arithmetic device that is electrically connected to each of the first flow rate controller, the second flow rate controller, and the gas component information acquisition device, wherein the gas component information acquisition device comprises:

a receiver that electrically receives from the rare gas using facility the flow rate information of the first gas component discharged from the rare gas using facility; and a receiver that electronically receives from the rare gas using facility the flow rate information of the second gas component discharged from the rare gas using facility, wherein the gas separation method comprises an introduction step in which the first gas component separated from the raw material gas is introduced as a first introduced gas into the raw material gas, and the second gas component separated from the raw material gas is introduced as a second introduced gas into the raw material gas, and wherein, based on each of flow rates of the first gas component and the second gas component in the discharged gas, which are obtained by the gas component information acquisition device in the introduction step, each of total gas flow rate S1 and total gas flow rate S2 as shown below is controlled to be constant, Total gas flow rate S1: total of a flow rate $V_{F1}$ of the first gas component in the discharged gas and the flow rate $V_{R1}$ of the first introduced gas Total gas flow rate S2: total of a flow rate $V_{F2}$ of the second gas component in the discharged gas and the flow rate $V_{R2}$ of the second introduced gas.

5. The gas separation method according to claim 1, wherein the first gas component is krypton or xenon.

6. The gas separation method according to claim 1, wherein the second gas component contains at least one selected from the group consisting of hydrogen, nitrogen, oxygen, helium, neon and argon.

7. The gas separation method according to claim 1, wherein the discharged gas discharged from the rare gas using facility further contains a third gas component, wherein after the first gas component separated from the raw material gas is introduced into the raw material gas as the first introduced gas, and the second gas component separated from the raw material gas is introduced as the second introduced gas into the raw material gas, the third gas component is removed from the raw material gas.

8. The gas separation method according to claim 7, wherein the third gas component is an organic compound.

9. The gas separation method according to claim 2, wherein the first gas component is krypton or xenon.

10. The gas separation method according claim 2, wherein the second gas component contains at least one selected from the group consisting of hydrogen, nitrogen, oxygen, helium, neon and argon.

11. The gas separation method according claim 2, wherein the discharged gas discharged from the rare gas using facility further contains a third gas component, wherein after the first gas component separated from the raw material gas is introduced into the raw material gas as the first introduced gas, and the second gas component separated from the raw material gas is introduced as the second introduced gas into the raw material gas, the third gas component is removed from the raw material gas.

12. The gas separation method according to claim 11, wherein the third gas component is an organic compound.

13. The gas separation method according claim 3, wherein the first gas component is krypton or xenon.

14. The gas separation method according claim 3, wherein the second gas component contains at least one selected from the group consisting of hydrogen, nitrogen, oxygen, helium, neon and argon.

15. The gas separation method according claim 3, wherein the discharged gas discharged from the rare gas using facility further contains a third gas component, wherein after the first gas component separated from the raw material gas is introduced into the raw material gas as the first introduced gas, and the second gas component separated from the raw material gas is introduced as the second introduced gas into the raw material gas, the third gas component is removed from the raw material gas.

16. The gas separation method according to claim 15, wherein the third gas component is an organic compound.

17. The gas separation method according claim 4, wherein the discharged gas discharged from the rare gas using facility further contains a third gas component, wherein after the first gas component separated from the raw material gas is introduced into the raw material gas as the first introduced gas, and the second gas component separated from the raw material gas is introduced as the second introduced gas into the raw material gas, the third gas component is removed from the raw material gas.

18. The gas separation method according to claim 17, wherein the third gas component is an organic compound.

19. A gas separation device comprising:
a separation unit that comprises an adsorption tower, and separates a first gas component and a second gas component from a raw material gas containing a plurality of gas components by pressure adsorption;
a raw material gas container that stores the raw material gas;
a first supply pipe that supplies a discharged gas discharged from a rare gas using facility into the raw material gas container;
a second supply pipe that connects the raw material gas container and the separation unit;
a first separated gas container that stores the first gas component separated by the separation unit;
a second separated gas container that stores the second gas component separated by the separation unit;
a first introduction pipe that introduces the first gas component in the first separated gas container as a first introduction gas into the raw material gas;
a second introduction pipe that introduces the second gas component in the second separated gas container as a second introduction gas into the raw material gas;
a first flow rate controller that is provided in the first introduction pipe;
a second flow rate controller that is provided in the second introduction pipe;
a gas component information acquisition device that acquires information of the first gas component and the second gas component which flow through the first supply pipe; and
an arithmetic device that is electrically connected to each of the first flow rate controller, the second flow rate controller, and the gas component information acquisition device, wherein when
a flow rate meter provided in the first supply pipe is denoted by A
a densitometer that is provided in the first supply pipe and measures the concentration of the first gas component is denoted by B
a densitometer that is provided in the first supply pipe and measures the concentration of the second gas component is denoted by C
a receiver that electrically receives from the rare gas using facility the flow rate information of the first gas component discharged from the rare gas using facility is denoted by D, and
a receiver that electronically receives from the rare gas using facility the flow rate information of the second gas component discharged from the rare gas using facility is denoted by E,
the gas component information acquisition device is made of at least one selected from the group consisting of:
a combination of A, and at least one of B and C;
a combination of A, and at least one of D and E; and
a combination of D and E, and
wherein, based on each of flow rates of the first gas component and the second gas component in the discharged gas which is obtained by the gas component information acquisition device, the first flow rate controller controls a flow rate $V_{R1}$ of the first introduced gas that is introduced from the first separated gas container through the first introduction pipe into the raw material gas such that a total gas flow rate S1 of a flow rate $V_{F1}$ of the first gas component in the discharged gas discharged from the rare gas using facility and a flow rate $V_{R1}$ of the first introduced gas introduced into the raw material gas from the first separated gas container through the first introduction pipe is constant, and the second flow rate controller controls a flow rate $V_{R2}$ of the second introduced gas that is introduced from the second separated gas container through the second introduction pipe into the raw material gas such that a total gas flow rate S2 of a flow rate $V_{F2}$ of the second gas component in the discharged gas discharged from the rare gas using facility and a flow rate $V_{R2}$ of the second introduced gas introduced into the raw material gas from the second separated gas container through the second introduction pipe is constant.

20. A gas separation device comprising:
a separation unit that comprises an adsorption tower, and separates a raw material gas containing a first gas component, a second gas component, and inevitable impurities using a gas separation device;
a raw material gas container that stores the raw material gas;
a first supply pipe that supplies a discharged gas discharged from a rare gas using facility into the raw material gas container;
a second supply pipe that connects the raw material gas container and the separation unit;
a first separated gas container that stores the first gas component separated by the separation unit;
a second separated gas container that stores the second gas component separated by the separation unit;
a first introduction pipe that introduces the first gas component in the first separated gas container as a first introduction gas into the raw material gas;
a second introduction pipe that introduces the second gas component in the second separated gas container as a second introduction gas into the raw material gas;

a first flow rate controller that is provided in the first introduction pipe;

a second flow rate controller that is provided in the second introduction pipe;

a gas component information acquisition device that acquires information of the first gas component and the second gas component which flow through the first supply pipe; and an arithmetic device that is electrically connected to each of the first flow rate controller, the second flow rate controller, and the gas component information acquisition device, wherein when a densitometer that is provided in the first supply pipe and measures the concentration of the first gas component is denoted by B a densitometer that is provided in the first supply pipe and measures the concentration of the second gas component is denoted by C a receiver that electrically receives from the rare gas using facility the flow rate information of the first gas component discharged from the rare gas using facility is denoted by D, and a receiver that electronically receives from the rare gas using facility the flow rate information of the second gas component discharged from the rare gas using facility is denoted by E, the gas component information acquisition device is made of a combination of:

at least one B and C; and at least one of D and E, and wherein, based on each of flow rates of the first gas component and the second gas component in the discharged gas which is obtained by the gas component information acquisition device, the first flow rate controller controls a flow rate $V_{R1}$ of the first introduced gas that is introduced from the first separated gas container through the first introduction pipe into the raw material gas such that a total gas flow rate S1 of a flow rate $V_{F1}$ of the first gas component in the discharged gas discharged from the rare gas using facility and a flow rate $V_{R1}$ of the first introduced gas introduced into the raw material gas from the first separated gas container through the first introduction pipe is constant, and the second flow rate controller controls a flow rate $V_{R2}$ of the second introduced gas that is introduced from the second separated gas container through the second introduction pipe into the raw material gas such that a total gas flow rate S2 of a flow rate $V_{F2}$ of the second gas component in the discharged gas discharged from the rare gas using facility and a flow rate $V_{R2}$ of the second introduced gas introduced into the raw material gas from the second separated gas container through the second introduction pipe is constant.

* * * * *